United States Patent [19]

Cook

[11] Patent Number: 5,006,097

[45] Date of Patent: Apr. 9, 1991

[54] CONTROL UNIT FOR SINGLE AND DOUBLE TRACK BLINDS

[76] Inventor: Henry Cook, 32 Smith St., Freeport, N.Y. 11520

[21] Appl. No.: 543,095

[22] Filed: Jun. 25, 1990

[51] Int. Cl.$^5$ ............................................. F16G 15/00
[52] U.S. Cl. .................................... 474/154; 160/188; 474/203
[58] Field of Search ................ 474/154, 203; 160/188, 160/181, 309, 319, 321

[56] References Cited

U.S. PATENT DOCUMENTS

| | | |
|---|---|---|
| 2,935,881 | 5/1960 | Cayton ............................ 474/154 X |
| 3,187,596 | 6/1965 | Doerr .............................. 474/154 X |
| 4,424,852 | 1/1984 | Hopper ........................... 474/154 X |

Primary Examiner—Thuy M. Bui
Attorney, Agent, or Firm—Michael I. Kroll

[57] ABSTRACT

A control unit for single and double track blinds is provided and consists of a sprocket wheel having a hub rotatably carried in the center of a passageway within a housing. An operating handle extends into the hub that extends through a central aperture in a front cover plate on the housing. The operating handle can be turned to rotate the sprocket wheel, thus driving a bead chain through the passageway to operate louvers in the single and double track blinds.

7 Claims, 2 Drawing Sheets

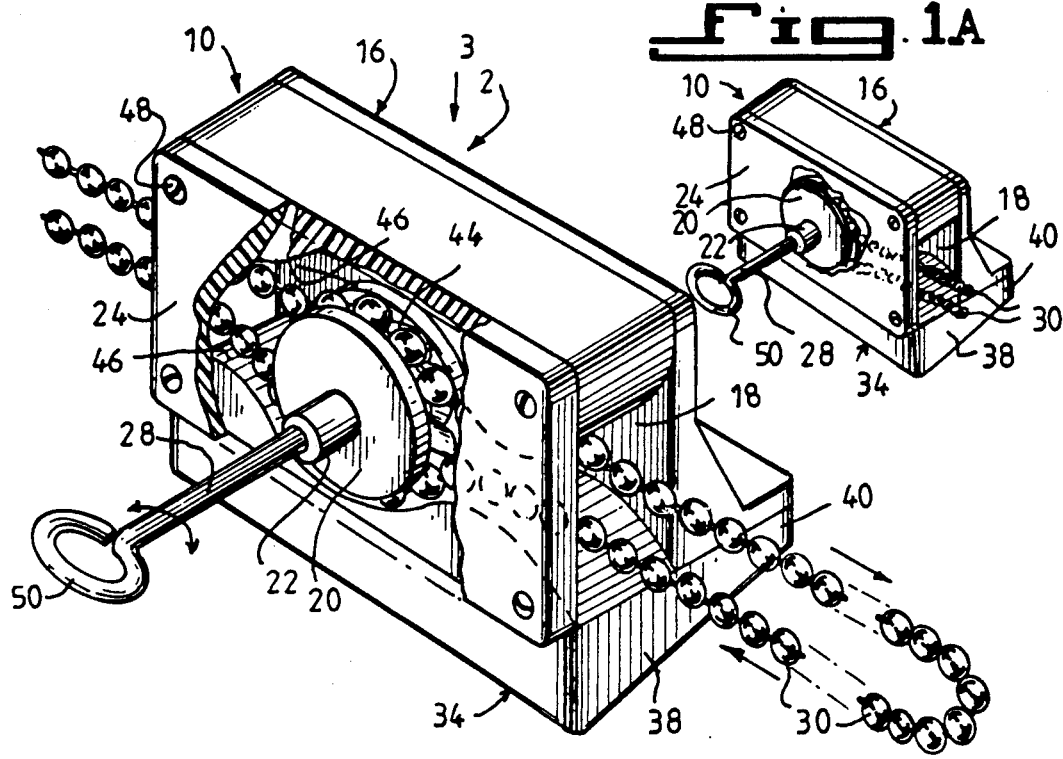
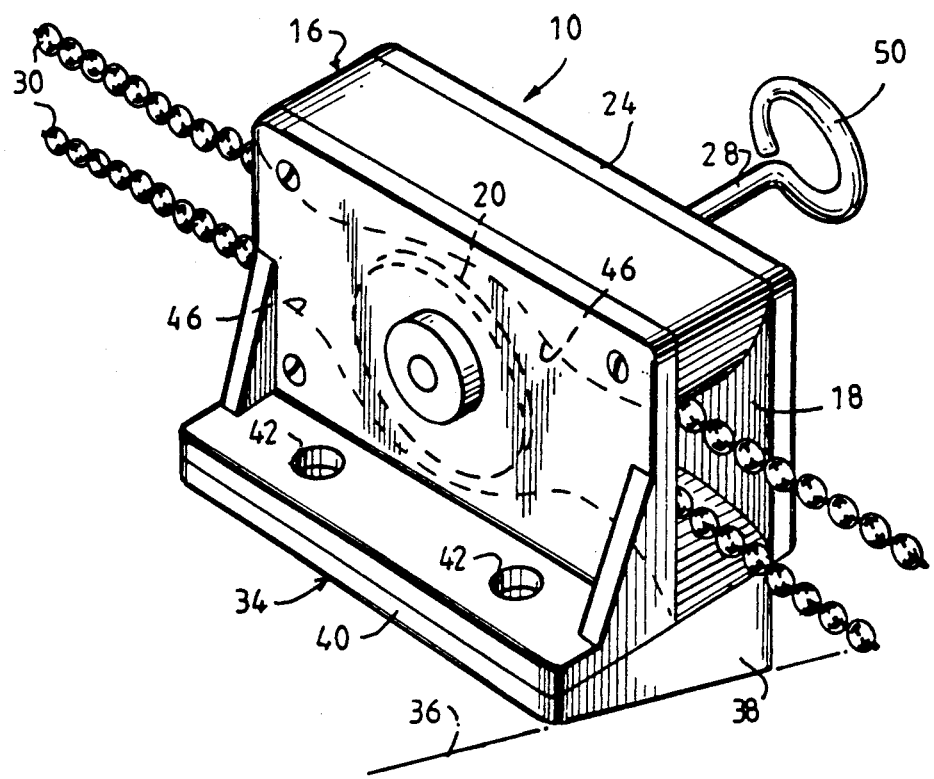

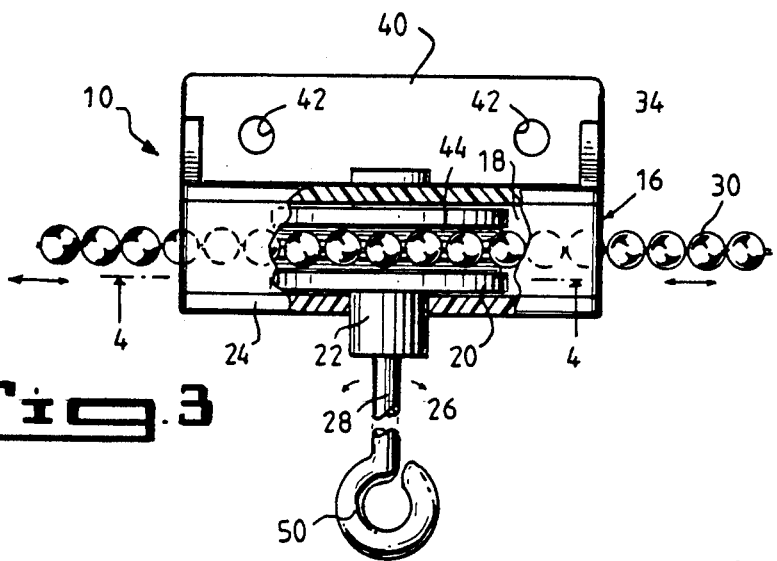
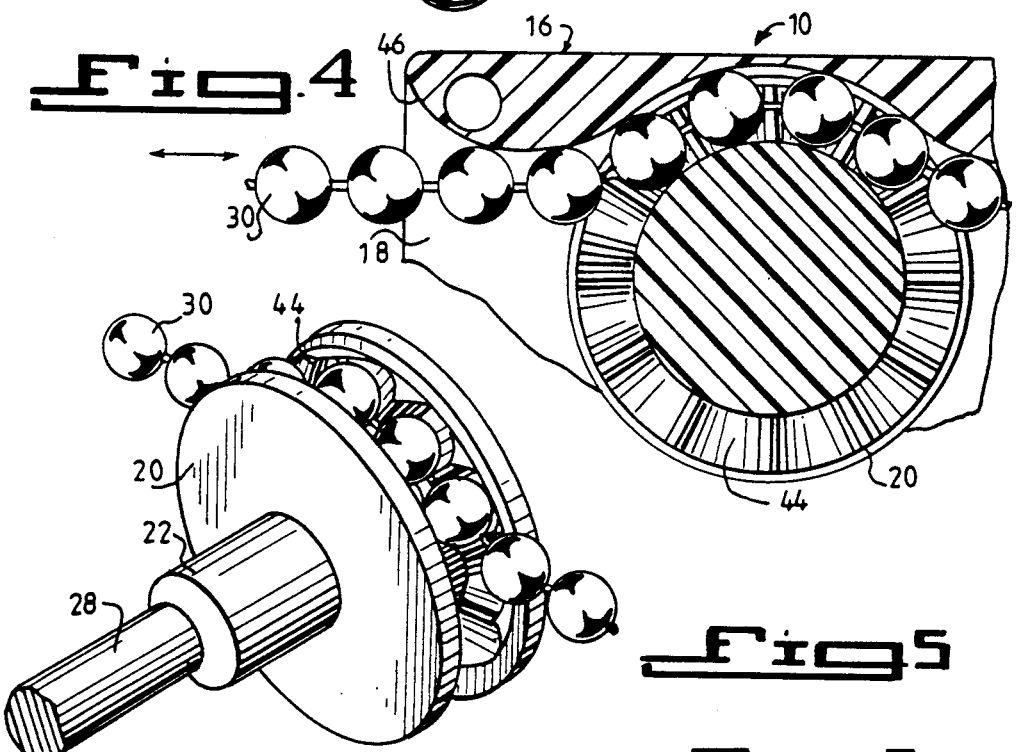
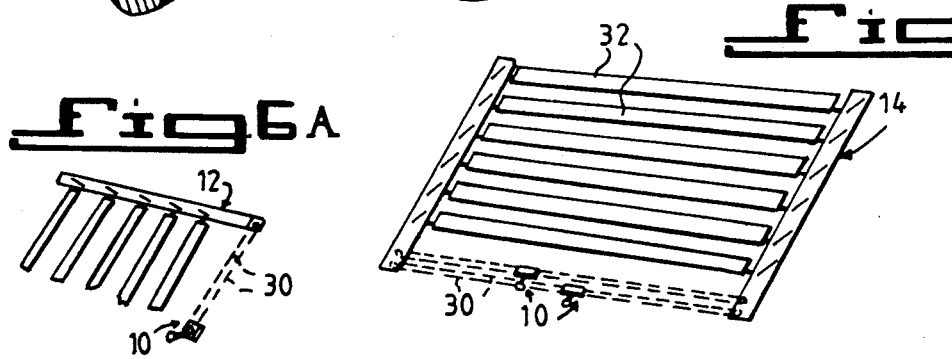

5,006,097

CONTROL UNIT FOR SINGLE AND DOUBLE TRACK BLINDS

BACKGROUND OF THE INVENTION

1. Field of the Invention

The instant invention relates generally to window covering and more specifically it relates to a control unit for single and double track blinds.

2. Description of the Prior Art

Numerous window coverings have been provided in prior art that are adapted to control the amount of light which enters through windows. While these units may be suitable for the particular purpose to which they address, they would not be as suitable for the purposes of the present invention as heretofore described.

SUMMARY OF THE INVENTION

A primary object of the present invention is to provide a control unit for single and double track blinds that will overcome the shortcomings of the prior art devices.

Another object is to provide a control unit for single and double track blinds in which the control unit can be utilized for traversing and rotating louvers in a double track blind on a skylight.

An additional object is to provide a control unit for single and double track blinds in which the control unit can be utilized in a remote location for operating louvers in a single track blind on a window.

A further object is to provide a control unit for single and double track blinds that is simple and easy to use.

A still further object is to provide a control unit for single and double track blinds that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the invention with parts broken away and in section showing it being used for a skylight.

FIG. 1A is a front perspective view of the invention similar to FIG. 1, showing it being used for a window.

FIG. 2 is a rear perspective view as indicated by arrow 2 in FIG. 1.

FIG. 3 is a top view as indicated by arrow 3 in FIG. 1 with parts broken away and in section.

FIG. 4 is a cross sectional view as indicated by line 4—4 in FIG. 3 with parts removed.

FIG. 5 is a front perspective view of the sprocket wheel with the operating handle and bead chain broken away.

FIG. 6 is a diagrammatic perspective view of a double track blind that can be used on a skylight showing two control units for traversing and rotating the louvers.

FIG. 6A is a diagrammatic perspective view of a single track blind that can be used on a window, showing the control unit in a remote location for operating the louvers.

DETAILED DESCRIPTION OF THE PREFERRED EMBODIMENTS

Turning now descriptively to the drawings, in which similar reference characters denote similar elements throughout the several views, the Figures illustrate a control unit 10 for single and double track blinds 12 and 14 consisting of a housing 16 having a passageway 18 therethrough. A sprocket wheel 20 has a hub 22 rotatably carried in the center of the passageway 18 within the housing 16. A front cover plate 24 has a central aperture 26 therethrough and is attached to the housing 16 over the sprocket wheel 20 so that the hub 22 extends through the central aperture 26. An operating handle 28 extends into the hub 22 of the sprocket wheel 20 so that the operating handle 28 can be turned to rotate the sprocket wheel 20, thus driving a bead chain 30 through the passageway 18 of the housing 16 to operate louvers 32 in the single and double track blinds 12 and 14.

The housing 16 includes a mechanism 34 for mounting the housing 16 onto a stationary surface 36. The mounting mechanism 34 is a base member 28 being triangular in cross section so that the housing 16 tips backward. The base member 38 has a rearwardly extending flange portion 40 with a pair of spaced apart mounting holes 42 therethrough to receive screws that go into the stationary surface 36.

The sprocket wheel 20 has a recess 44 about its circumference shaped to receive the bead chain 30, while the passageway 18 in the housing 16 has a curved surface 46 therein so that the bead chain 30 can ride through the top and the bottom of the passageway 18 past the sprocket wheel 20 in opposite directions when the sprocket wheel 20 is rotated.

The front cover plate 24 is attached to the housing 16 by four bolts 48, each extending through one corner of the front cover plate 24 into the housing 16 so that the front cover plate 24 can be removed and replaced when needed. The operating handle 28 further includes an eye 50 formed on its free end so that it can be operated by a hand, an extension pole and an electric motor. The housing 16, the sprocket wheel 20 and the front cover plate 24 are all fabricated out of a durable plastic material, while the operating handle 28 is made out of a metal material.

The single track blind 12, as shown in FIG. 6A, is normally used on a window with the control unit 10 in a remote location for operating the louvers 32. The double track blind 14 as shown in FIG. 6, can be used on a skylight with two control units 10 for traversing and rotating the louvers 32.

List of Reference Numbers

10: control unit,
12: single track blinds,
14: double track blinds,
16: housing,
18: passageway in 16,
20: sprocket wheel,
22: hub on 20,
24: front cover plate,
26: central aperture in 24,
28: operating handle,
30: bead chain,
32: louvers,
34: mounting mechanism, 36: stationary surface,
38: base member,
40: flange portion of 38,
42: mounting,
44: recess in 20,
46: curved surface in 18,
48: bolts,
50: eye.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A control unit for single and double track blinds comprising:
    (a) a housing having a passageway therethrough;
    (b) a sprocket wheel having a hub rotatably carried in the center of the passageway within said housing;
    (c) a front cover plate having a central aperture therethrough and is attached to said housing over said sprocket wheel so that the hub extends through the central aperture; and
    (d) an operating handle extending into the hub of said sprocket wheel so that said operating handle can be turned to rotate said sprocket wheel, thus driving a bead chain through the passageway of said housing to operate louvers in the single and double track blinds.

2. A control unit as recited in claim 1, wherein said housing includes means for mounting said housing onto a stationary surface.

3. A control unit as recited in claim 2, wherein said mounting means is a base member being triangular in cross section so that said housing tips backward, said base member having a rearwardly extending flange portion with a pair of spaced apart mounting holes therethrough to receive screws that go into the stationary surface.

4. A control unit as recited in claim 3, wherein said sprocket wheel has a recess about its circumference shaped to receive the bead chain while the passageway in said housing has a curved surface therein so that the bead chain can ride through the top and bottom of the passageway past said sprocket wheel in opposite directions when said sprocket wheel is rotated.

5. A control unit as recited in claim 4, wherein said front cover plate is attached to said housing by four bolts, each extending through one corner of said front cover plate into said housing so that said front cover plate can be removed and replaced when needed.

6. A control unit as recited in claim 5, wherein said operating handle further includes an eye formed on its free end so that it can be operated by a hand, an extension pole and an electric motor.

7. A control unit as recited in claim 6, wherein said housing, said sprocket wheel and said front cover plate are all fabricated out of a durable plastic material, while said operating handle is made out of a metal material.

* * * * *